UNITED STATES PATENT OFFICE 2,233,608

CELLULAR GLASS AND PROCESS OF MANUFACTURE THEREOF

Elmer H. Haux, Tarentum, and William O. Lytle, New Kensington, Pa., assignors to Pittsburgh Plate Glass Company, a corporation of Pennsylvania No Drawing. Application December 28, 1937, Serial No. 182,168

4 Claims. (Cl. 49—77)

The present invention relates to cellular materials and more particularly to a glass product through which a plurality of individual cells are dispersed and to a process of manufacturing such product.

The primary object of the present invention is to provide an improved cellular glass which may be annealed at atmospheric temperatures and which will have a higher insulating value against both heat and sound than ordinary cellular glass.

A second object of my invention is to provide a process by means of which a cellular glass may be produced more readily and at a lower cost than is now possible with conventional methods.

Other objects and advantages of this invention will become more apparent from the following detailed description of the preferred embodiments thereof.

It has heretofore been proposed to incorporate a gaseous medium such as carbon dioxide with molten or plastic glass in order to form a cellular body through which small bubbles of the gas are dispersed. Such bodies have comparatively high insulating values against both heat and sound. However, the walls of the cells in such bodies comprise solid glass which necessarily imparts a relatively high apparent density to the mass. Furthermore, careful annealing at gradually decreasing temperatures is required in order to reduce the internal stresses present in the glass.

Briefly stated, the present invention contemplates the preparation of a cellular glass by the liberation of a gas in molten or plastic glass containing a granular porous material distributed therein. In this manner, the granular material, such as vermiculite or diatomaceous earth, becomes embedded in the walls of the individual cells. When so incorporated, the porous material decreases the apparent density of the cellular glass and, at the same time, increases the insulating value of the product. Moreover, bodies of this cellular glass, if not too thick, do not require gradual cooling in a leer in order to reduce internal strains.

Substantially any convenient process may be employed in forming the cellular glass with which is incorporated the additional porous material. For example, a mixture of ground glass, a porous material and a gassing agent, such as calcium carbonate, may be heated to the fusing temperature of the glass to produce a plastic mass, which is transformed, under additional heat, into a cellular product by the decomposition of the calcium carbonate. It is also possible to heat together a porous material and ground glass in a closed container under pressure. In this process, the glass particles fuse together entrapping air or gas in the molten mass, and a release of the pressure permits the entrapped gas to expand with the production of a cellular structure in the molten material. Likewise it is possible to force air or other gas into molten glass containing a porous material in order to produce a foam or froth which is then cooled to provide a solid product.

In all of these processes, it will be apparent that glass in a partially molten or plastic state and containing particles of a porous material is converted into a cellular mass by gases liberated externally of the porous material. The gaseous bubbles, as formed, tend to displace the particles of porous material and to consolidate them in the glass walls between the bubbles. Accordingly, the walls are rendered light and non-conductive to heat and sound by reason of the inclusions of the porous material therein.

As an example of my invention the following procedure is given: Ground window glass of a particle size sufficiently small to pass a 28 mesh screen is admixed with from ½ to 2 per cent by weight of calcium carbonate and to this mixture is added from 1 to 8 per cent by weight of ground vermiculite of a size sufficient to pass a 10 mesh screen. The granular material is placed in a mold, heated to approximately 1200° F. until the glass particles weld together, and is then subjected to a temperature of from 1550 to 1750° F. At this elevated temperature, the calcium carbonate is decomposed into a gas and the glass is softened sufficiently to permit the gas to expand. The vermiculite remains substantially unchanged in the walls surrounding each gas cell. The cellular glass resulting is then cooled.

Although vermiculite is given as the specific example of the porous material which is incorporated in the cellular glass, other light weight granular insulating materials which do not change their composition at temperatures in the range of 1500 to 1800° F. may be used. Diatomaceous earth and cellular clay are contemplated as falling within the provisions of this invention.

The addition of one of these light weight insulating materials to the cellular glass decreases the apparent density of the resultant product, without materially affecting its strength and adaptability to industrial purposes. The cell walls are rendered more porous and accordingly the insulating value of the cellular glass is increased. At the same time, a smaller percentage of glass is present in the product and accordingly its cost is reduced.

It has been discovered that the presence of the inert porous material in the cellular glass has a pronounced effect upon the physical properties of that glass. For example, with the ordinary cellular glass, great care must be taken in annealing the product to prevent its disintegration under internal stresses created by cooling. When a portion of the glass has been replaced by vermiculite, however, small units of the cellular glass may be cooled rapidly. The glass may be removed from the mold as soon as it is sufficiently rigid to maintain its shape and the product is cooled at room temperatures. It will at once be obvious that this feature will eliminate the use of an annealing leer or oven, and further reduce the manufacturing cost. Larger blocks of cellular glass containing vermiculite must be cooled more slowly, but the amount of care for such cooling or annealing is markedly less than that ordinarily required.

One of the disadvantages heretofore encountered in the production of cellular glass is the tendency of the product to expand unevenly to produce a concave or otherwise irregular upper surface. This upper surface must, therefore, be cut away in order that a block of uniform thickness may be obtained. It has been found that the addition of vermiculite, or other porous material of the class disclosed, eliminates this objectionable feature. The cellular glass produced in accordance with my invention may be obtained as a uniform block directly from the mold, thus eliminating waste.

It will be obvious that various modifications and alterations may be made in the invention as shown and described without departing from the spirit thereof or the scope of the appended claims.

What we claim is:

1. A process of manufacturing cellular glass which comprises forming a mixture of molten glass and a granular porous material, subsequently adding a gas to the mixture from a source extraneous of the porous material to produce an expanded cellular body, and cooling the cellular body said cellular body containing the porous material permanently embedded therein.

2. A process of manufacturing cellular glass which comprises heating a mixture of crushed glass, calcium carbonate and vermiculite, fusing the glass into a coherent mass, and subsequently liberating carbon dioxide gas therein by the decomposition of the calcium carbonate to produce an expanded cellular product in which the vermiculite is embedded in a matrix of glass between the individual cells.

3. A process of manufacturing cellular glass which comprises dispersing from 1 to 8 per cent by weight of granular vermiculite, of a size sufficient to pass a 10 mesh screen, through an intimate mixture of crushed glass and calcium carbonate, heating the mixture to fuse the glass particles together, continuing the heating at an increased temperature to render the glass more plastic and to decompose the calcium carbonate, the carbon dioxide so produced forming an expanded foam of the plastic glass, and finally cooling the resultant product, the granular vermiculite remaining unchanged during the entire process.

4. The process of manufacturing cellular glass which comprises admixing a granular porous heat-resistant body with glass crushed to pass a screen of about 28 mesh and about ½ to 2 per cent of calcium carbonate, heating the mixture to sinter together the particles of glass and continuing to heat the mixture to decompose the calcium carbonate, thereby liberating bubbles of carbon dioxide and forming a coherent cellular structure in which are permanently embedded particles of porous material, the ultimate temperature being above 1500° F. and finally cooling the material to provide a cellular heat-insulating body.

ELMER H. HAUX.
WILLIAM O. LYTLE.